Dec. 14, 1965 H. W. GRISWOLD 3,223,575
SHEET MATERIALS

Filed Jan. 4, 1961 2 Sheets-Sheet 1

INVENTOR
HECTOR W. GRISWOLD
BY
Alexander T. Kardos
ATTORNEY

Dec. 14, 1965    H. W. GRISWOLD    3,223,575
SHEET MATERIALS
Filed Jan. 4, 1961    2 Sheets-Sheet 2
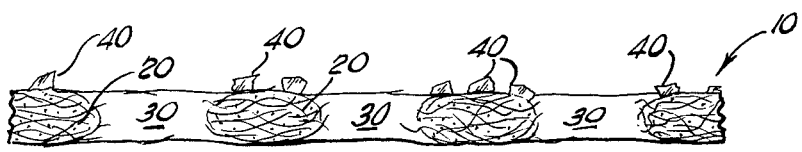
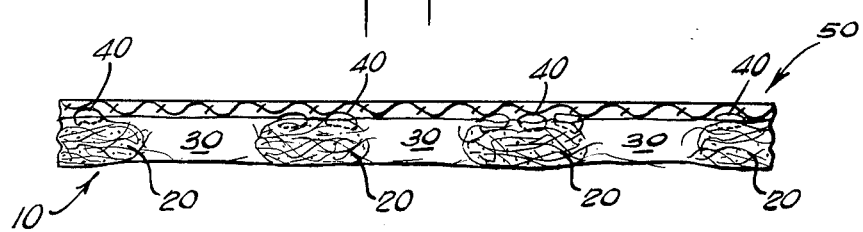
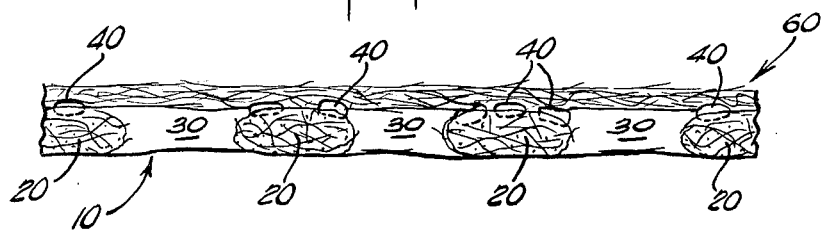
INVENTOR.
HECTOR W. GRISWOLD
BY Alexander T. Kardos
ATTORNEY

United States Patent Office 3,223,575
Patented Dec. 14, 1965

3,223,575
SHEET MATERIALS
Hector W. Griswold, Princeton, N.J., assignor, by mesne assignments, to Johnson & Johnson, New Brunswick, N.J., a corporation of New Jersey
Filed Jan. 4, 1961, Ser. No. 80,599
3 Claims. (Cl. 161—83)

The present invention relates to inherently self-heat-sealable sheet materials having excellent flexibility and capable of being laminated to flexible base sheet materials without undesirably stiffening the same or causing them to lose flexibility materially. More particularly, the present invention is concerned with flexible inherently self-heat-sealable nonwoven textile materials having a particular construction whereby such desirable properties and characteristics are realized.

Various sheet materials, particularly in textile fabric or paper form, having self-heat-sealable properties are well known to industry. For example, sheet materials such as woven fabrics, nonwoven fabrics, felts, paper, film, etc., have had incorporated therein or deposited thereon potentially thermoplastic or adhesive substances which may be activated or rendered tacky and adhesive whereby the sheet materials may be more or less permanently adhered to themselves in folds or pleats, or to other materials in a laminated structure. The methods employed in developing the desired thermoplasticity or adhesivity are well known to the industry and normally have involved the application of heat and/or pressure and/or solvents.

Many of these potentially heat-sealable materials are of extensive commercial applicability but have been found objectionable in some uses where it is desired that the final laminated product not be stiffened to any great degree and that it possess excellent flexibility, drapeability and conformability. This is, of course, important, particularly where the inherently self-heat-sealable sheet material is to be adhered to a base sheet material to be used as a textile garment or similar material having a required flexibility, drapeability and conformability.

It is therefore a principal purpose of the present invention to provide an inherently self-heat-sealable sheet material which is capable of being adhered to a base sheet material, such as a textile garment, without undesirably stiffening the same or causing any material loss in flexibility therein.

It has been discovered that such a purpose may be achieved by using as the heat-sealable sheet material a sheet material which is perforated or otherwise provided with openings and by depositing on such a perforated sheet material potentially thermoplastic or adhesive substances which are capable of being activated or rendered tacky and adhesive in the heatsealing process.

The perforations or openings in the sheet material are larger than the size of the thermoplastic substances which are deposited thereon whereby any thermoplastic substances falling upon the body portion of the sheet material itself are retained thereby whereas any thermoplastic substances falling into the openings readily pass therethrough. In this way, the openings in the perforated sheet material remain open and form areas therein which are not subsequently sealed to the base sheet material.

In this way, when the perforated sheet materials having the thermoplastic particles thereon are adhered to the base sheet materials, the union between the two is not continuous and uninterrupted like an imperforate film, for example, but is actually discontinuous and broken in those areas where the fabric openings have permitted the passage therethrough of the thermoplastic particles. It is this lack of continuity of adhesion between the sealed sheet materials which prevents an undesirable increase in stiffness or a loss in flexibility in the resulting laminated structure.

In the accompanying drawings and following specification, there are illustrated and described preferred embodiments of the present inventive concept but it is to be understood that the invention is not to be considered as limited to the constructions shown except as determined by the scope of the appended claims. It is also to be noted that the figures are not drawn exactly to scale but that liberties have been taken so that the invention can be defined more clearly. Referring to the accompanying drawings:

FIGURE 2 is a schematic view of a cross section taken through the fabric of FIGURE 1.

FIGURES 3 and 4 are schematic views of cross sections taken through laminates of this invention.

Figure 1:
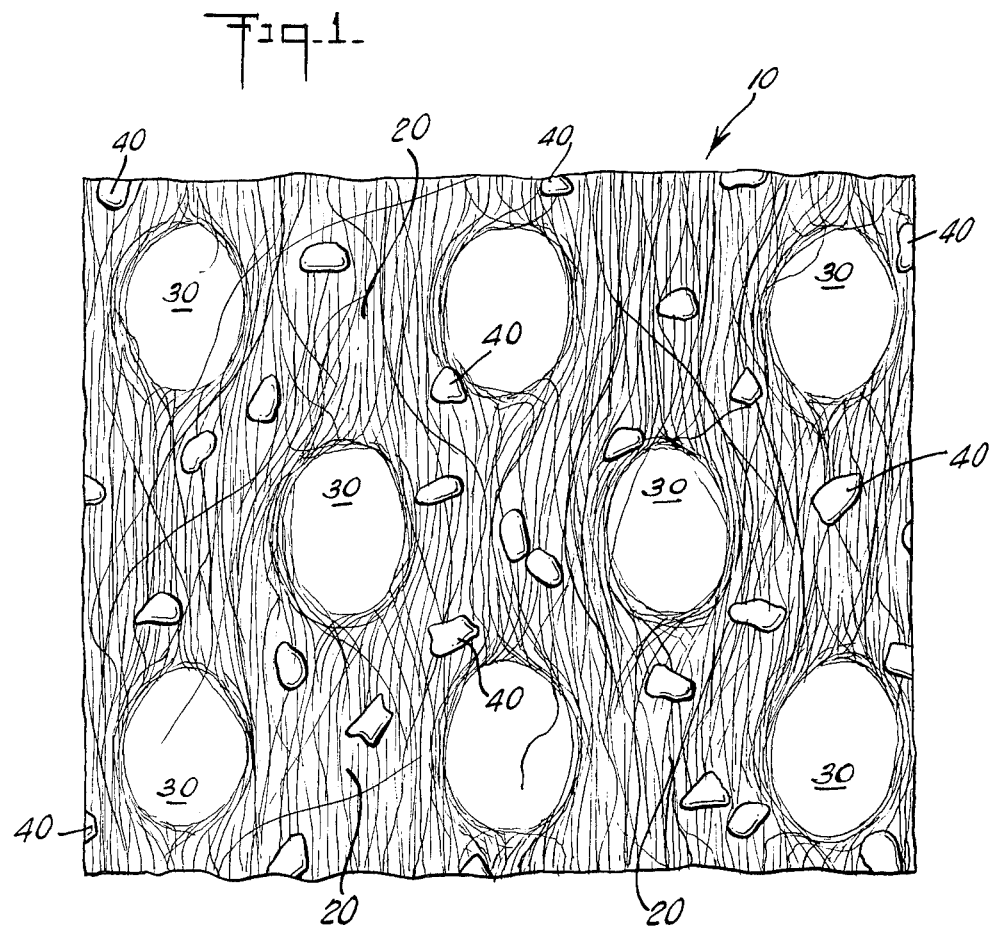
FIGURE 1 is a fragmentary plan view on an enlarged scale, diagrammatically illustrating a portion of a perforated sheet material upon which have been deposited granules or particles of a thermoplastic or heat-activatable substance.

With reference to FIGURE 1, there is illustrated a "Keybak" nonwoven fabric 10 as the sheet material to which have been applied granules or particles of the desired heat-sealable substance 40. Although a "Keybak" nonwoven fabric will be used to describe the more specific aspects of the present invention, it is to be appreciated that such is illustrative and not limitative of the present invention. Other sheet materials containing punched or otherwise formed openings including other nonwoven fabrics, woven fabrics, felts, paper, film, etc., are also of application to the present invention.

When a nonwoven fabric is used, the weight thereof ranges from about 170 grains per square yard up to about 4,000 or more grains per square yard. Other sheet materials may be correspondingly lighter or heavier, as desired or required. The nature and source of such sheet materials may be natural, man-made or synthetic and may comprise cellulosic materials such as rayon, cotton, linen, paper, wood fibers, cellulose esters such as cellulose acetate, etc., or non-cellulosic materials such as wool, silk, polyamides, polyesters, acrylics, modacrylics, vinyls, etc.

The nonwoven fabric 10 shown in FIGURE 1 comprises rearranged fiber bundles 20 and fabric openings 30, the formation of which is described in greater detail in Kalwaites U.S. Patent 2,862,251, which issued December 2, 1958. As shown, the perforations or openings 30 are essentially circular, or slightly elliptical due to stretching or elongation of the nonwoven fabric 10 during handling subsequent to formation. Such circular or "elongated" circular openings are, of course, primarily illustrative. Other shapes of openings, such as ovals, triangles, rectangles, squares, or other regular or irregular polygons or other closed figures, etc., may be used. The average size of these fabric openings is such that they are basically larger than the size of the thermoplastic granules being used, so that any granule falling upon an opening will not become lodged but will pass therethrough.

The size of these fabric openings will depend to a large extent upon its particular shape, that is, circular, rectangular, etc., and its ability to pass granules therethrough. For example, when the openings are circular, the average diameter thereof is greater than the average diameter of the granules. When the openings are square, the important dimensions or effective diameters are the two axes, rather than the two diagonals, inasmuch as the two axes are more critical in determining what size granule can pass therethrough. In general, it may be stated that the average effective diameter of the fabric openings may be as small as about 0.018 inch and as large as about 0.125 inch or more. Smaller size fabric openings may be used but such will require the use of even smaller average size granules which is often not desirable. Larger size fabric openings may also be used, up to 0.250 inch or more, whereby larger average size granules may be employed but the use of larger size granules has often been found to result in a decrease in effective heatsealing properties.

Within the more commercial aspects of the present invention, sizes of fabric openings in the range of from about 0.027 inch to about 0.065 inch have been found most advantageous, particularly for nonwoven fabrics.

The size of the granules 40 deposited on the nonwoven fabric 10 is determined by the size of the openings 30 in the nonwoven fabric. In general, it may be stated that granules having an average diameter less than 0.84 mm. (840 microns or 0.0331 inch) capable of passing through a No. 20 U.S. standard sieve have been found satisfactory for many purposes. Average granule diameters down to about 0.149 mm. (149 microns or 0.006 inch) capable of passing through a No. 100 U.S. standard sieve have been found satisfactory where such smaller sizes are more desirable. Mixtures of various sizes within these described limits may also be satisfactorily used. Regardless of the size selected, however, it must be remembered that the average size of the granules must be sufficiently less than the size of the openings so that the granules are capable of readily passing through the openings.

FIGURE 2 represents a cross section taken through the fabric 10 of FIGURE 1 prior to heating to cause the thermoplastic granules 40 to adhere to the individualized surface fibers of fiber bundles 20 of the nonwoven fabric 10. Note should be taken of the fact that the openings or holes 30 in the fabric 10 are free of thermoplastic granules 40. Upon heat treatment, the granules 40 loose their craggy appearance and engage the individualized fibers of bundles 10 by engulfing portions of these filaments to effect claw-like sites of attachment.

In FIGURE 3 the fabric 10 has been heat treated to cause the granules 40 to attach themselves to the fibers of bundles 20. The fabric 10 with granules 40 attached is then caused to adhere to a woven cotton cloth 50 as, for instance, in accordance with the procedure of Example I. The adhesion sites between the nonwoven sheet 10 and the woven cotton cloth 50 are the granules 40 which, through the use of heat and some pressure, have been secured to the fibers of the woven sheet 50 by the same mechanism that earlier effected their attachment to the individualized fibers of nonwoven sheet 10. Note again that the openings 30 are free of granules 40, therefore, undesirable stiffening of the laminate has been precluded.

FIGURE 4 depicts a laminate of this invention similar to that shown in FIGURE 3 with the sole exception that the fabric 60 is a nonwoven fabric of individualized fibers. The mechanism effecting the adhesion of the thermoplastic particles 40 to both the nonwoven sheet 10 and the nonwoven sheet 60 is the same as was explained above.

With regard to the nature of the thermoplastic granules which are deposited on the perforated textile structure, it is to be stated that any potential thermoplastic or adhesive granule may be employed provided it is capable of being activated or rendered tacky and adhesive at a sufficiently low temperature as to avoid damage to the sheet material to which it is to be adhered. As specific examples of such thermoplastic materials, there may be mentioned cellulose esters such as cellulose acetate, vinyl resins such as vinyl chloride-vinyl acetate copolymers, polyolefin resins such as polyethylene and polypropylene, polyamide resins such as nylon 6 (polycaprolactam) and nylon 6/6 (hexamethylene diamine-adipic acid), acrylic resins, etc.

For purposes of further describing the invention, polyethylene granules will be employed but it is to be observed that such is illustrative only and is not to be construed as limitative of the broader aspects of the present invention.

The amount of the heat-sealable substance which is applied to and retained by the sheet material will vary according to the purposes and requirements involved. From about 50 to about 400 grains per square yard have been found satisfactory for practically all purposes, with from about 150 to about 350 grains per square yard being more commonly used for most purposes.

The methods of applying the granules or particles of the thermoplastic substance to the sheet material are not critical and substantially any known process of uniform distribution may be employed. For example, the granules may be sifted through screens having openings of a desired size such as slightly greater than the largest granule present. Or, if desired, the granules may be deposited from a "salt-shaker" form of apparatus wherein the sheet material is placed on a carrier and passes under a vibrating container having openings in the bottom thereof to permit the passage therethrough of the thermoplastic granules to fall upon the sheet material passing thereunder. Provision should also be made to permit the thermoplastic granules which fall into the fabric openings to readily pass therethrough. Slits or openings in the carrier conveying the sheet material have been found satisfactory.

After the granules have been deposited on the sheet material and the granules falling into the openings have passed therethrough, passage through a heated oven takes place in order to adhere the granules to the sheet material. The sheet processing temperatures may range from about 325° F. to about 425° F., depending upon the particular type of thermoplastic material present and upon the degree of thermoplasticity or adhesivity desired.

All temperatures referred to herein are the temperatures of the sheet material being processed; the oven temperatures being sufficiently higher to produce the indicated sheet temperatures. In general, the upper temperature limits will be dictated by the possibility of damage to the sheet materials employed; the lower temperature limits will be dictated by the flow characteristics of the thermoplastic substance used.

The length of the exposure of the sheet material carrying the thermoplastic granules thereon to the above-mentioned temperatures is inversely interdependent upon the temperature used. That is to say, for higher temperatures, the exposure should be shorter, and for lower temperatures the exposure should be longer. Exposure times of from about 8 to 10 seconds or even less, to about 3 minutes, have been found satisfactory, with preferred exposures being in the lower portion of that range and extending from about 10 seconds to about 1 minute.

If desired, the sheet material may be reversed and turned upside down and additional granules deposited thereon, followed by passage through the heated oven for a second exposure. In this way, the sheet material may be faced on both sides with thermoplastic granules.

After the sheet material with the adhered granules thereon is removed from the heated oven, it may be adhered to itself in folds or pleats or it may be adhered to other sheet materials by simply being pressed with a heated iron, such as an ordinary household iron, or by a heated platen, roller, mangle, etc., adjusted to the proper temperature. The temperatures of adherence or lamination are approximately in the same range mentioned hereinbefore or may be lowered to some degree due to the fact that pressure is being exerted on the granules whereby their fusion or adhesion temperatures are lowered. In general, however, it has been found that shorter time periods are required for laminating with a heated pressing surface.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example I*

A two-foot-square piece (24" x 24") of an acrylic-bonded "Keybak" nonwoven fabric comprising 100% viscose rayon fibers, 1½ denier, 1 9/16 inches staple length, and weighing about 800 grains per square yard is used as the sheet material. There are approximately 165 elongated circular openings per square inch in the nonwoven fabric with each opening measuring about 0.045 inch in the cross direction and about 0.050 inch in the long direction. The pattern is a staggered or offset pattern (see the figure) with about 7 openings to the inch in the cross direction and about 12 openings to the inch in each staggered row in the machine or long direction.

A linear polyethylene ("Grex," sold by W. R. Grace & Company) made by a low pressure process and having: a relatively high melt index of 13.6, as measured at 190° C. and 2160 grams (ASTM D-1238-57T), and considerably higher when measured at 250° C. and 2,160 grams; an ultimate tensile strength of about 3900 pounds per square inch (ASTM D-638-58T); and a relatively high density of 0.95 is used as the heat-sealable thermoplastic linear polyolefin. The polyethylene is in the form of granules having a particle size such that substantially 100% by weight passes through a No. 20 U.S. standard sieve (0.84 mm. or 0.0331 inch opening); 96% by weight passes through a No. 30 U.S. standard sieve (0.59 mm. or 0.0232 inch opening); 28% by weight passes through a No. 40 U.S. standard sieve (0.42 mm. or 0.0165 inch opening); 14% by weight passes through a No. 50 U.S. standard sieve (0.297 mm. or 0.117 inch opening); with only 4% by weight passing through a No. 80 U.S. standard sieve (0.17 mm. or 0.007 inch opening); and 100% being retained on a No. 100 U.S. standard sieve (0.149 mm. or 0.006 inch opening).

The polyethylene granules are sprinkled on the nonwoven fabric substantially uniformly at random in an amount equal to a retention of about 250 grains per square yard. The granules falling in the openings are permitted to pass through. The granule-coated nonwoven fabric is then placed in a heated oven for three minutes. The oven is maintained at a sufficiently high temperature to bring the fabric temperature to about 360° F. The polyethylene softens and adheres to the nonwoven fabric in the form of individual granules.

The nonwoven fabric with the polyethylene granules adhered thereto is removed from the oven and cooled. It is then brought into contact with a two-foot-square piece (24" x 24") of 80 x 80 woven cotton cloth and pressed with a conventional household iron maintained at a temperature of about 350° F. A comfortable hand pressure is exerted on the iron during the pressing which lasts for a few seconds. The rayon nonwoven fabric and the cotton woven fabric are examined and are found to be strongly adhered to each other and to be undamaged by such heat treatments. It is noted that the elongated circular openings in the nonwoven fabrics are not filled with thermoplastic material.

The laminated rayon nonwoven-cotton woven fabric is found to be very flexible and to possess excellent drapeability and conformability. Its stiffness is not increased materially. It can be used as a garment part, with the nonwoven fabric acting as an interfacing or interlining.

*Example II*

The procedures of Example I are followed substantially as set forth therein with the exception that a different "Keybak" nonwoven fabric is used which has elongated circular openings therein having a diameter of about 0.065 inch in the cross direction and a diameter of about 0.075 inch in the long direction. The same type polyethylene thermoplastic granules are used. The results are comparable.

*Example III*

The procedures of Example I are followed substantially as set forth therein except that a different "Keybak" nonwoven fabric is used which has elongated circular openings therein having a diameter of about 0.027 inch in the cross direction and about 0.030 inch in the long direction. The granules used are also finer in that 100% by weight passes through a No. 30 U.S. standard sieve (0.59 mm. or 0.0232 inch opening). The results are comparable.

Without being bound to the following explanation of retention of flexibility, drapeability and conformability in the laminated structure without material increase in stiffness, it is believed that the following takes place during heatsealing. At the relatively high temperatures of heatsealing, plus the pressure usually applied therein, the thermoplastic granules soften and spread laterally to form an adherent film between the joined sheet material. This film provides some rigidity and inherently increases the stiffness of the resulting laminated structure. However, when the heat-sealable material is provided with openings, any film which is formed is interrupted by the openings and hence possesses less rigidity and consequently does not materially increase its stiffness.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. A flexible inherently heat-sealable nonwoven sheet material adapted to be laminated to a flexible textile base sheet material comprising a flexible nonwoven sheet material having openings therein of an average effective diameter of from about 0.018" to about 0.125", said flexible sheet material having secured substantially on the surface thereof, between said openings, a thermoplastic, potentially adhesive substance in the form of granules having an average diameter of from about 0.006" to about 0.0331", said granules having an average size smaller than the average size of said openings thereby substantially precluding other than a random bonding between said base sheet and said heat-sealable sheet and thereby precluding an undesirable stiffening of said textile base sheet material.

2. A textile structure comprising a flexible base textile sheet material and a flexible nonwoven inherently heat-sealable sheet material having openings therein of an average effective diameter of from about 0.018" to about 0.125" and a thermoplastic adhesive substance adhered substantially between the openings in said flexible inherently heat-sealable nonwoven sheet material and bonding, in random fashion, said base textile sheet material to said inherently heat-sealable sheet material to provide a laminate free of undesirable stiffness as compared with said original base textile sheet.

3. A flexible inherently heat-sealable nonwoven sheet material capable of being laminated to a flexible base sheet material comprising a flexible nonwoven sheet material having openings therein, said openings having an average effective diameter of from about 0.018" to about 0.250", said flexible sheet material having randomly adhered, substantially on the surface thereof between said openings, from about 50 to about 400 grains by weight per square yard of a thermoplastic, potentially adhesive substance in the form of granules having an average diameter of from about 0.006" to about 0.0331", with the proviso that said granules have an average effective diameter smaller than the average effective diameter of said openings thereby preventing impregnation of said openings and thereby allowing randomized bonding between said base and said foraminous sheet material to preclude an undesirable stiffening of said base material.

References Cited by the Examiner

UNITED STATES PATENTS

| | | | |
|---|---|---|---|
| 1,978,620 | 10/1934 | Brewster | 154—127 |
| 2,132,907 | 10/1938 | Sperber | 154—46 |
| 2,603,575 | 7/1952 | Schramm | 154—122 |
| 2,668,787 | 2/1954 | Schramm | 154—122 |
| 2,862,251 | 12/1958 | Kalwaites | 19—161 |
| 2,992,149 | 7/1961 | Drelich. | |

EARL M. BERGERT, *Primary Examiner.*

CARL F. KRAFFT, *Examiner.*